United States Patent [19]

Plow et al.

[11] 4,314,322
[45] Feb. 2, 1982

[54] THREE PHASE REGULATED SUPPLY WITH RIPPLE CURRENT REGULATION

[75] Inventors: Robert J. Plow, Avon Lake; Jerry C. Rader, Grafton, both of Ohio

[73] Assignee: Reliance Electric Company, Cleveland, Ohio

[21] Appl. No.: 127,869

[22] Filed: Mar. 6, 1980

[51] Int. Cl.³ .............................................. H02M 1/14
[52] U.S. Cl. ...................................... 363/46; 363/48; 363/87
[58] Field of Search ........................... 320/57, 59, 60; 324/119; 363/52–54, 44–48, 81, 87, 129

[56] References Cited

U.S. PATENT DOCUMENTS

| | | |
|---|---|---|
| 3,453,526 | 7/1969 | Bowles .................................. 363/46 |
| 3,577,059 | 5/1971 | Kelly, Jr. ............................... 363/48 |
| 3,748,568 | 7/1973 | Ackermann ....................... 363/45 X |

OTHER PUBLICATIONS

*1979 Telecommunications Power Equipment Seminar,* Lorain Products Corp., Subsection 1.1, pp. 1–8; Subsection 1.2, pp. 1–8.

*Primary Examiner*—William M. Shoop

*Attorney, Agent, or Firm*—Michael M. Rickin; Roy F. Hollander

[57] ABSTRACT

A circuit for use in a multiphase regulated supply to provide regulation of the ripple current contained in the filtered d.c. output signal of the supply. The supply regulates its output voltage and/or current by controlling the conduction time of the switching elements contained in the rectifier portion of the supply. The switching element conduction time is controlled by controlling the generation of firing pulses to the switching elements as a function of an error control signal which is equal to a first error signal. This signal is equal to the amount by which the actual value of said voltage and-/or current deviates from a reference value of said parameter. When the ripple regulation circuit is included in the supply, a second error signal is generated which represents the deviation of the d.c. value of the ripple from a predetermined reference. Also included in the ripple regulation circuit is circuitry for selecting the error control signal as equal only to the larger amplitude one of the first and second error signals. The supply therefore regulates only voltage and/or current until the ripple becomes excessive at which point the supply regulates only ripple.

21 Claims, 6 Drawing Figures

THREE PHASE REGULATED SUPPLY WITH RIPPLE CURRENT REGULATION

BACKGROUND OF THE INVENTION

1. Field of the Invention

This invention relates to three phase regulated supplies utilizing switching elements to maintain output voltage regulation and more particularly to circuitry for detecting excess output ripple and regulating the supply output voltage in accordance therewith.

2. Description of the Prior Art

Three phase regulated supplies utilizing switching elements such as thyristors or triacs to maintain output voltage regulation are known. In thyristor controlled supplies the thyristor is used both as a rectifier and as a control element. For low and medium power applications the thyristors are typically placed in the secondary of a three phase transformer configuration. There are two thyristors for each phase. The output voltage of the supply is controlled by firing the thyristors in a predetermined sequence. The point at which the thyristors are fired in relation to the half cycle of ac input voltage determines the output voltage.

In triac controlled (also known as controlled ferroresonant) regulated supplies, the triac is used to switch an inductor in and out of a tank circuit electronically to thereby provide output voltage regulation. As the triac exhibits symmetrical bidirectional characteristics it functions as a bidirectional thyristor and thus only one triac is used per phase. By turning on the triac at varying phase angles with respect to the input voltage the supply output voltage is made lower or higher and thereby controlled.

Three phase regulated supplies have found application in both power supplies and in telephone central offices as battery chargers. Three phase battery chargers typically regulate their output voltage by controlling the switching element firing time in accordance with either the regulated supply output voltage and/or regulated supply output current. The regulated supply output voltage and output current are compared to known reference signals to thereby generate signals to control the firing of the switching elements. Typically the regulated supply operates under output voltage control. However if the regulated supply output current should exceed the reference setting the supply will then operate under output current control.

One problem associated with three phase regulated supplies is the excessive ripple in the output current which results if one of the input phases is either totally lost or becomes unbalanced with respect to the other phases. Loss of a phase or unbalance in the phases causes the output ripple current to increase. Where output filter capacitors are used in the three phase rectifier, the excessive ripple current can cause either failure of the filter capacitors or blowing of the associated fuses.

In the past it has been common practice to monitor the ac input voltage and if a phase was lost or an unbalance occurred, then the regulated supply was shut off to avoid any damaging affects from excessive ripple current. However in many instances such a drastic remedy is not necessary. Even in those circumstances where a phase is lost or a phase unbalance occurs the supply is still capable of generating some useful output voltage. Very rarely does the supply ever operate at full load capacity. Such a situation might, for example, occur where following a total power failure at a telephone central office it is necessary that the regulated supply both recharge the batteries and supply the load. Such conditions occur infrequently. Thus in most circumstances it is desirable to keep the regulated supply operating and supplying a load even in the presence of either a lost input phase or an input phase unbalance.

The circuit of the present invention allows the three phase regulated supply to continue to operate and supply light load conditions under the above circumstances, as long as the output ripple does not exceed a predetermined magnitude. Thus, in addition to controlling the firing times of the switching elements as a function of the regulated supply output voltage and/or output current the circuit of the present invention allows the firing times of the switching elements to be controlled as a function of the magnitude of the ripple present at the supply output.

SUMMARY OF THE INVENTION

According to the present invention a circuit adapted for use in a multiple regulated supply provides ripple current regulation. The supply generates a filtered d.c. output signal having ripple by controlling an adjustable regulating means in response to an error control signal which is equal to a first error signal. The first error signal has a magnitude dependent on the amount by which an actual value of the d.c. output signal deviates in a predetermined direction from a reference value.

The circuit comprises means which responds to the ripple to generate a second error signal whose amplitude is dependent on the amount by which the actual d.c. value of the ripple deviates from a desired d.c. value of the ripple. Means in the circuit respond to the first and second error signals to select the error control signal as being equal only to the larger amplitude one of the first and second error signals. When the error control signal is equal to the second error signal the regulating means is adjusted to maintain the ripple d.c. value substantially equal to the desired value.

DESCRIPTION OF THE PREFERRED EMBODIMENT

Figure 1:
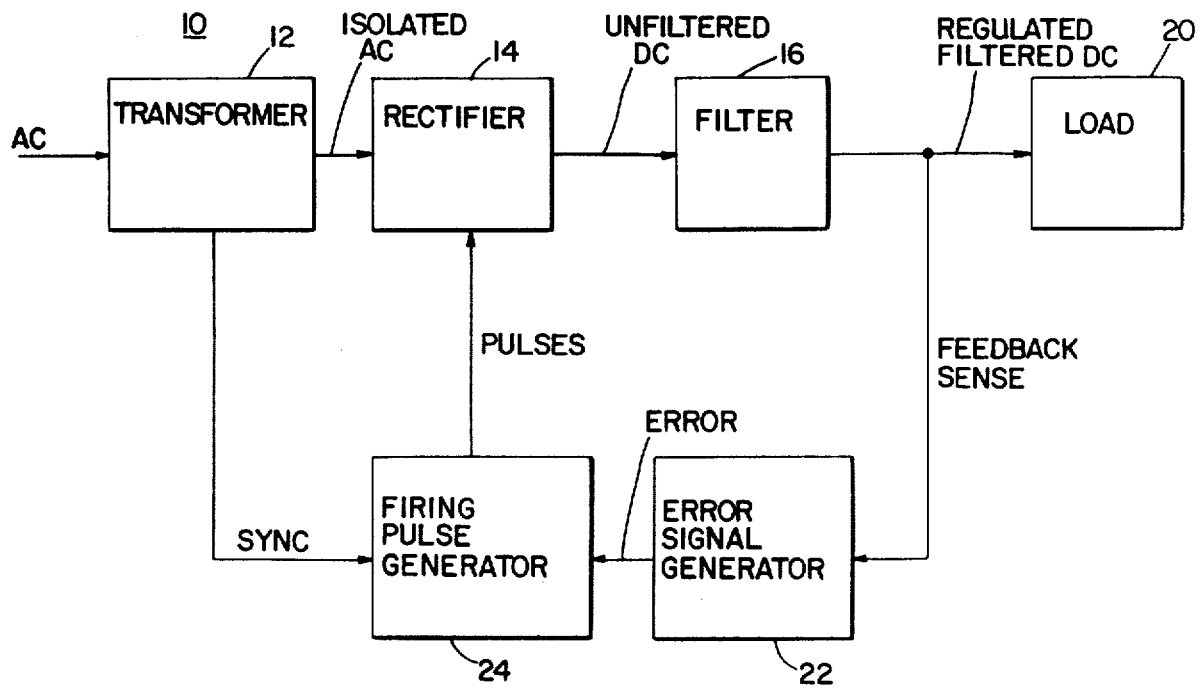
FIG. 1 shows a simplified block diagram of a three phase regulated supply of the type in which the circuit of the invention may be utilized.

Referring to FIG. 1 there is shown a simplified block diagram of a three phase regulated supply which utilizes switching elements to maintain output voltage/current regulation and in which the circuit of the invention may be utilized to obtain output ripple regulation. Such a supply may for example be any of the RHM series of supplies manufactured by Lorain Products Corporation of Lorain, Ohio.

Transformer 12 receives on its primary winding a three phase ac voltage from a suitable source and provides a three phase ac output voltage on its secondary winding. Rectifier 14 rectifies the ac signals appearing on the transformers secondary winding to provide an unfiltered dc signal. Rectifier 14 provides rectification by a suitable arrangement of switching elements such as thyristors. Typically there are two thyristors for each phase of the input ac voltage. Conduction of the thyristors is controlled by pulses generated by firing circuit 24. The unfiltered dc generated by rectifier 14 is filtered by filter 16 to provide regulated and filtered dc to load 20.

In a typical three phase regulated supply one or more output parameters such as voltage and/or current are sensed. The sensed parameter is compared to a predetermined reference signal in circuit 22 to thereby generate an error signal to pulse circuit 24. The error signal is utilized by pulse circuit 24 to control the time at which firing pulses are generated to the thyristors of rectifier 14. In order that the firing pulses for each pair of thyristors may be synchronized to the ac input voltage, transformer 12 provides a synchronizing signal to pulse generating circuit 24. The synchronizing signal is a sample of the ac input voltage for each phase.

Figure 2:
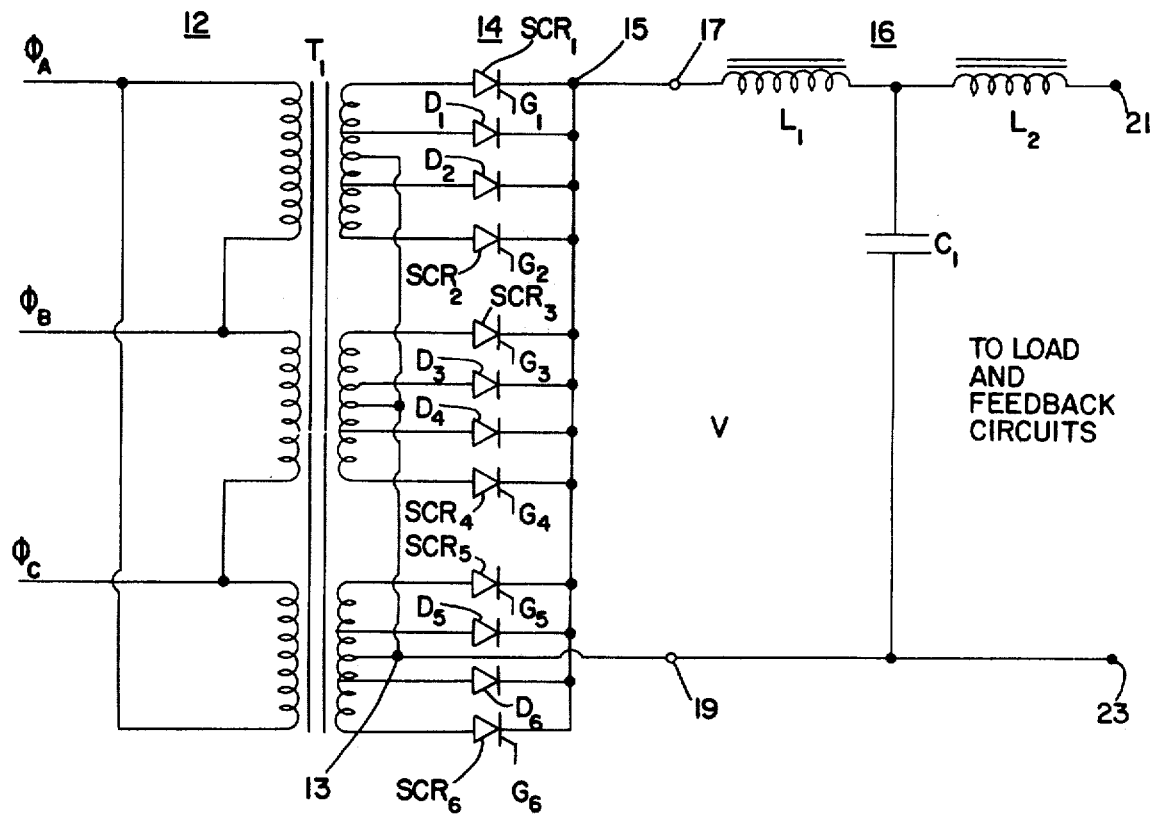
FIG. 2 shows a detailed schematic diagram for transformer 12, rectifier 14 and filter 16 of FIG. 1.

Referring to FIG. 2 there is shown a detailed schematic diagram for transformer 12, rectifier 14 and filter 16 of FIG. 1.

Transformer 12 consists of a three phase delta connected primary winding and a double star connected secondary winding. The three phase inputs to the primary winding are designated as $\phi A$, $\phi B$ and $\phi C$. The center tap of each phase of the secondary winding is connected together.

Connected to each secondary phase winding are a pair of thyristors designated as SCR1 to SCR6. Thyristors SCR1 and SCR2 each have their anodes connected to one end of the secondary winding for phase A. In a similar fashion thyristors SCR3 and SCR4 are each connected to the secondary winding for phase B and thyristors SCR5 and SCR6 are each connected to the second winding for phase C.

Associated with each thyristor is a control or gate electrode designated as G1 to G6 for thyristors SCR1 to SCR6 respectively. When reverse biased a thyristor blocks voltage in the manner of a conventional diode. When forward biased a thyristor also blocks voltage until a signal is applied to the gate. Upon application of the gating signal the thyristor begins to conduct. The thyristor continues to conduct as long as forward current is passed through it, even though the gate signal has been removed.

Connected intermediate the center tap and the associated thyristor at each secondary phase winding are a pair of diodes D1 to D6. Diodes D1 and D2 are each associated with the secondary winding for phase A, diodes D3 and D4 are each associated with the secondary winding for phase B and diodes D5 and D6 are each associated with the secondary winding for phase C. Diode D1 has its anode connected to the secondary winding for phase A intermediate the windings center tap connection and the connection of the associated thyristor SCR1. Diode D2 has its anode connected to the secondary winding for phase A intermediate the windings center tap connection and the connection of the associated thyristor SCR2. In a similar fashion diode pairs D3 and D4 are each connected to the secondary winding for phase B and diode pairs D5 and D6 are each connected to the secondary winding for phase C.

The cathodes of thyristors SCR1 to SCR6 and diodes D1 to D6 are connected together at junction 15. Diodes D1 to D6 provide an output voltage even in the absence of conduction of the associated thyristors. When the thyristors are gated into conduction during the ac half cycle the supply output voltage is increased. Conduction of the thyristors allows additional windings of the transformer secondary to be inserted into the supply output circuit. The point at which the thyristors are fired in relation to the ac half cycle determines the output voltage. If the thyristors are gated at the beginning of the half cycle, the supply output voltage is high. If the thyristors are gated later in the half cycle, the output voltage will decrease, and if the thyristors are gated at the end of the half cycle, the supply output voltage is dependent only on the output voltage available from those secondary windings of the transformer associated with the diodes.

Diodes are included in those three phase thyristor regulated supplies where the range of output voltage to be controlled is limited. Such circumstances may for example occur where the supply is utilized as a battery charger. The voltage of the battery never goes to zero. Typically the battery voltage ranges between 1.75 volts per cell at full discharge to 2.35 volts per cell at full charge. Thus the battery charger need only control a range of output voltage and the diodes are utilized to determine the minimum output voltage.

An unfiltered dc voltage appears across output terminals 17 and 19 of rectifier 14. The unfiltered dc voltage is filtered by filter 16 to provide at supply output terminals 21 and 23 a regulated and filtered dc voltage. Filter 16 may for example be, as shown in FIG. 2, a T section filter comprising first and second inductors $L_1$ and $L_2$ and capacitor $C_1$. The filter functions in a manner so as to reduce the amplitude of the ripple voltage present in the unfiltered dc voltage at rectifier terminals 17 and 19. For 60 cycle ac input voltage a three phase rectifier of the type shown in FIG. 2 provides dc output voltage which contains a 360 cycle ripple. As will be described in more detail later on, capacitor $C_1$ provides a convenient point for monitoring the amplitude of the output ripple such that the circuit of the invention may be used in regulated supply 10 to provide output regulation in accordance therewith.

Figure 3:
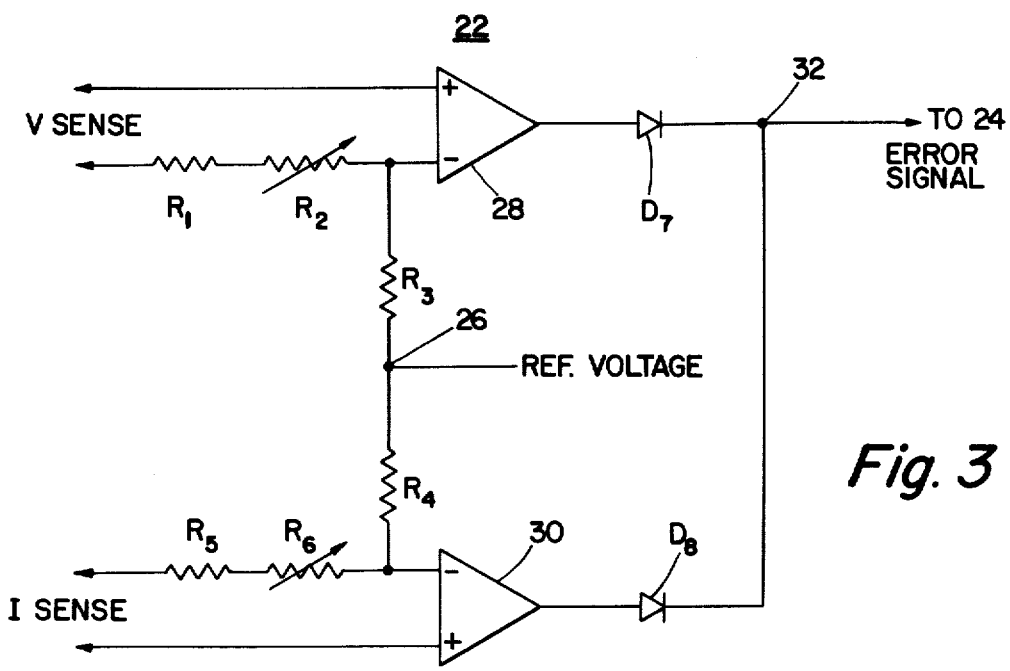
FIG. 3 shows a detailed schematic diagram for error signal generator 22 of FIG. 1.

Referring to FIG. 3 there is shown a detail schematic diagram for error signal generator 22 of FIG. 1.

Error signal generator 22 compares signals representing various regulated supply output parameters such as voltage and/or current to a predetermined reference signal to thereby generate an error signal. The error signal is utilized, as will be described hereinafter, by firing pulse generator 24 to control the firing of the supply's thyristors. The particular regulated supply output parameters which are sensed is dependent upon the end use for the regulated supply. Where the regulated supply is used as a power supply output regulation is provided by sensing only the output voltage. Thus in such applications the firing times of the thyristors are controlled in accordance with the regulated supply output voltage to thereby regulate the parameter.

Where the regulated supply is used as a battery charger both the output voltage and output current are sensed as shown in FIG. 3. During normal operation the battery charger provides regulation in accordance with the sensed output voltage. If the battery should become discharged it appears to the charger as a low impedance load and draws increased current from the charger. The magnitude of the current may exceed the rating of the charger. By providing regulation in accordance with the sensed output current that parameter is then limited to a predetermined safe magnitude. Thus, in response to excessive load the battery charger switches from a constant output voltage supply to a constant output current supply in order to protect the charger.

The circuit of FIG. 3 comprises operational amplifier 28 which is utilized to compare the sensed supply output voltage to a known reference and operational amplifier 30 which is utilized to compare the sensed supply output current to the known reference. The sensed voltage input to amplifier 28 may be taken from the output terminals of the supply (terminals 21 and 23 of FIG. 2). Where the regulated supply is used as a battery charger the sensed voltage may also be taken remotely from the battery. The sensed current input to amplifier 30 is a current dependent voltage which is usually derived from the shunt of an ammeter located in the regulated supply output circuit. The ammeter shunt typically provides a voltage whose amplitude is in the millivolt range. The shunt voltage must therefore be amplified before it is applied to amplifier 30. Rectifier output current may alo be sensed by more elaborate means such as dc current transformers which are used when it is desired to provide isolation between the regulated supply output and the sensing circuit.

The sensed supply output voltage and sensed supply output current are applied, respectively, to amplifiers 28 and 30 and compared with a known reference voltage. The reference voltage is applied by the dividing network comprising resistors R1, R2 and R3 to the inverting input of amplifier 28 and by the dividing network comprising resistors R4, R5 and R6 to the inverting imput of amplifier 30. The reference voltage has a predetermined magnitude which is related to the regulated supply output voltage and is generated from a source (not shown) which may, for example, be a zener diode.

The output of operational amplifiers 28 and 30 are connected through diodes $D_7$ and $D_8$, respectively, to junction 32. Diodes $D_7$ and $D_8$ are arranged in an "OR" configuration. This configuration allows the amplifier with the more positive output to forward bias its associated diode and reverse bias the diode associated with the other amplifier. During normal regulated supply operation the output of amplifier 28 will be more positive than the output of amplifier 30. Thus, during normal supply operation diode $D_7$ will conduct and diode $D_8$ will be nonconductive. An error signal will then be provided which is a function of the difference between the sensed supply output voltage and the reference voltage. Thus under normal operation the firing of the thyristors is controlled to provide a constant regulated supply output voltage.

If the load should increase such that the current dependent voltage representative of regulated supply output current exceeds the reference voltage the output of amplifier 30 will then become more positive than the output of amplifier 28. Under these circumstances diodes $D_8$ will conduct and diode $D_7$ will be nonconductive to thereby allow amplifier 30 to assume control of the pulse generation circuitry. Firing pulses to the thyristors will then be generated in accordance with the error signal from amplifier 30 to thereby provide a constant supply output current. Thus, where the regulated supply output current increases above the reference the supply switches from a constant output voltage supply to a constant output current supply.

Figure 4:
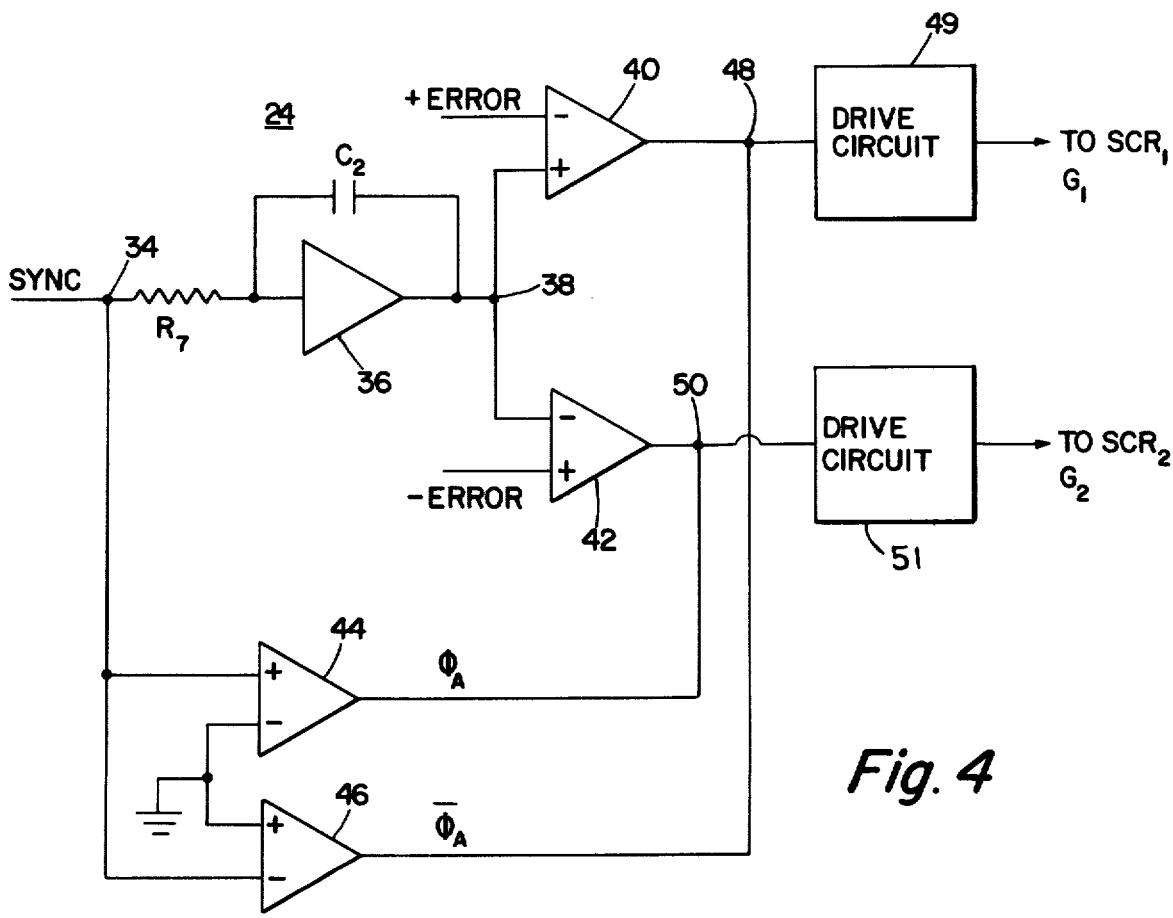
FIG. 4 shows a detailed schematic diagram for one phase of firing pulse generator 24 of FIG. 1.

Referring to FIG. 4 there is shown a detailed schematic diagram for that part of firing pulse generator 24 of FIG. 1 which controls one of the phases of three phase regulated supply 10. Generator 24 comprises three identical circuits, each circuit being associated with a respective one of the phases of rectifier 10. For ease of illustration only the circuit for generating firing pulses to SCRs 1 and 2 of phase A has been shown in FIG. 4. Identical circuits are included in generator 24 for generating firing pulses to SCRs 3 and 4 of phase B and SCRs 5 and 6 of phase C.

Firing pulses SCR 1 and 2 are generated in accordance with the error signal developed by generator 22. SCR 1 is gated into conduction during the negative half cycle of the phase A a-c input voltage and SCR 2 is gated into conduction during the positive half cycle of that voltage. SCRs 3 and 4 are gated into conduction during the negative and positive half cycles, respectively to the phase B a-c input voltage and SCRs 5 and 6 are gated into conduction during the negative and positive half cycles, respectively, of the phase C a-c input voltage. The point at which SCRs 1, 3 and 5 are gated into conduction are approximately 120° out of phase with respect to each other and similarly the point at which SCRs 2, 4 and 6 are gated into conduction are also approximately 120° out of phase with respect to each other. Thus, the SCRs of each phase are gated into conduction approximately 180° out of phase from each other and about 120° out of phase with respect to the SCRs of adjacent phases.

To insure that the firing pulses of SCRs 1 and 2 are synchronized to the ac voltage being applied to these SCRs, a sample of the voltage is provided to circuit 24 for use as a synchronizing signal. The synchronizing voltage may for example be provided by placing a tap on the secondary winding associated with each phase. Generator 24 utilizes the synchronizing voltage to provide a voltage against which the error signal is compared to thereby generate the firing pulses to SCRs 1 and 2 and to assure that SCRs 1 and 2 conduct only during the negative and positive half cycles respectively, of the a-c input voltage. Each of these uses for the synchronizing signal will now be described.

The synchronizing signal in the form of an ac voltage having a sinusoidal waveform is applied to junction 34. Operational amplifier 36, having a capacitor $C_2$ connected between the amplifier's input and output and having a resistor $R_7$ connected between junction 34 and the amplifier's input, functions as an integrator to provide at junction 38 an ac signal having a cosine waveform. The cosine signal is applied to the noninverting input of operational amplifier 40 and the inverting input of operational amplifier 42 to be compared to the error signal. The cosine signal is used for purposes of comparison in order that the transfer function of firing generator 24 may be linearized. A plot of the regulated supply output voltage as a function of the delay angle (the angle between the generation of a firing pulse for a phase and the zero crossing of the associated sinusoidal synchronizing signal), may be shown to follow a cosine function. Thus the use of a signal with a cosine waveform for purposes of comparison results in a cancellation of the cosine function of the output voltage delay angle characteristic to thereby linearize the transfer function of generator 24.

Error signals which are equal in magnitude but opposite in polarity are applied to the inverting input of operational amplifier 40 and the noninverting input of operational amplifier 42. The equal in magnitude but opposite in polarity error signals are developed from the error signal available at junction 32 of generator 22 (FIG. 3). A combination of one or more suitably arranged operational amplifiers may be used to generate error signals which are equal in magnitude and opposite in polarity from an input error signal. If the cosine voltage is more positive than the error signal, amplifier 40 will provide an output signal which will cause drive circuit 49 to generate a pulse to gate $G_1$ of SCR1 to thereby drive SCR1 into conduction. Simultaneously therewith the positive going cosine voltage is compared at amplifier 42 to the negative error signal. With the noninverting input of amplifier 42 more positive than the cosine voltage during the entire half cycle amplifier 42 provides an output which clamps drive circuit 51 to thereby hold thyristor SCR2 off. Thus during the positive half cycle of the cosine voltage a firing pulse will be developed to SCR1 provided that the cosine voltage is more positive than the error signal and SCR2 will be inhibited from firing.

During the negative half cycle of the cosine voltage the reverse effect will occur. When the negative error signal on the noninverting input of amplifier 42 becomes more negative than the cosine voltage appearing on the inverting input of the amplifier a firing pulse will be generated to SCR2. Simultaneously therewith the cosine voltge appearing on the noninverting input of amplifier 40 will be more negative than the reference signal appearing on the inverting input of the amplifier and thus drive circuit 49 will be held clamped to thereby prevent conduction of SCR1. Drive circuits 49 and 51 may be embodied, for example, by a transistor wherein the output signals developed by amplifiers 40 and 42 are applied to the base of the transistor, the emitter being connected to a known source of voltage and the firing pulse being taken from the collector thereof.

Amplifiers 44 and 46 are utilized to insure that each SCR does not conduct beyond its associated half cycle of the sinusoidal synchronizing voltage signal. The synchronizing voltage is applied to the noninverting input of amplifier 44 and the inverting input of amplifier 46. The inverting input of amplifier 44 and the noninverting input of amplifier 46 are both connected to ground. Thus amplifiers 44 and 46 function as comparators to thereby compare the synchronizing voltage to ground. The operation of generator 24 and of amplifiers 44 and 46 in particular will now be explained with reference to FIG. 5.

Figure 5:
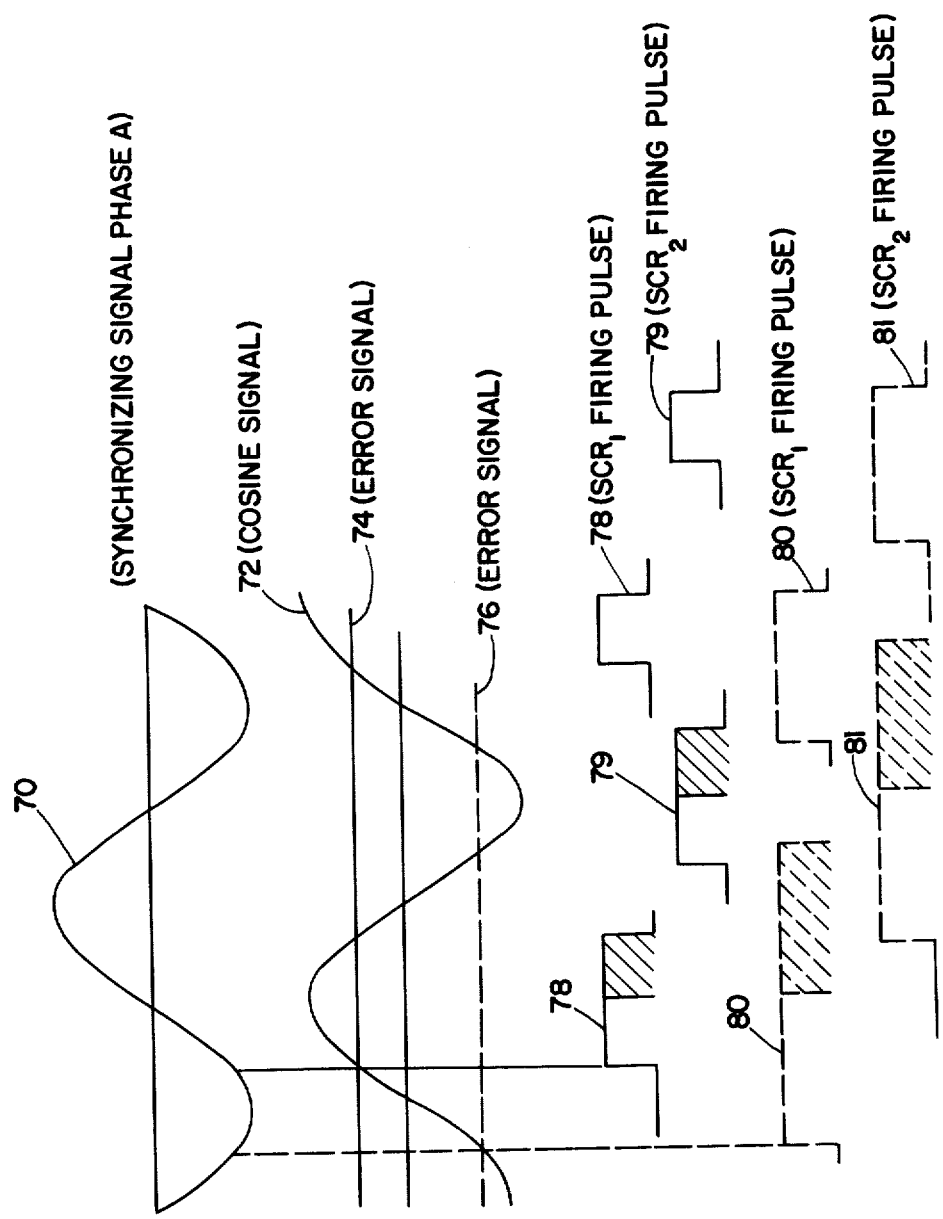
FIG. 5 shows various signal waveforms associated with the schematic diagram of FIG. 4.

Referring to FIG. 5 there are shown various signal waveforms which illustrate the operation of amplifiers 44 and 46. The phase A sinusoidal synchronizing voltage which appears at junction 34 is designated as 70. The cosine output waveform of the integrator which appears at junction 38 is designated as 72. The cosine waveform is compared to the positive and negative error signals at amplifiers 40 and 42. The firing signals for SCR1 and SCR2 are shown as pulses 78 and 79, respectively, for a positive error signal having a magnitude designated as 74. For the error signal having a positive magnitude designated as 76 the firing signals for SCR1 and SCR2 are shown as pulses 80 and 81, respectively. The operation of amplifiers 44 and 46 will first be explained for error signal 74 and then for error signal 76.

When cosine waveform 72 becomes more positive than error signal 74, amplifier 40 generates through drive circuit 49 a firing pulse 78 to SCR1. Positive half cycles of synchronizing waveform 70 truncate the firing pulse by means of amplifier 46 even though cosine waveform 72 is still more positive than error signal 74. The truncation is provided by having the output of amplifier 46 go to zero to thereby introduce at point 48 a signal such that the associated transistor of drive circuit 49 is clamped off. That portion of firing pulse 78 which is truncated by amplifier 46 is shown by the cross-hatched lines. Thus for error signal 74 a relatively short firing pulse is generated to SCR1 and the regulated supply output voltage is held to a relatively low value.

During the negative half cycle of the sinusoidal synchronizing waveform a firing pulse 79 is generated by amplifier 42 through driver 51 to SCR2. When the synchronizing waveform 70 goes through zero in a negative going direction the firing pulse is truncated by amplifier 44. The truncation is provided by having the output of amplifier 44 go to zero to thereby introduce at point 50 a signal such that the associated transistor of drive circuit 51 is clamped off. That portion of firing pulse 79 which is truncated by amplifier 44 is shown by the cross-hatched lines.

In order that the regulated supply output voltage may be increased it is therefore necessary that the thyristors conduct for a longer portion of each half cycle of the ac input voltage. To that end it is therefore necessary that the error signal decrease in magnitude to thereby intercept a larger portion of cosine signal 72. Error signal 76 which is lower in magnitude than error signal 74 intercepts more of cosine signal 72 to thereby allow SCR1 and SCR2 to be fired for a greater portion of their respective half cycles of the synchronizing voltage. The pulses generated in response to error signal 76 for firing SCR1 and SCR2 are shown at 80 and 81. As before amplifier 46 truncates the firing pulse 80 to SCR1 when waveform 70 is positive and amplifier 44 truncates the firing pulse 81 to SCR2 when waveform 70 is negative. The portion of pulse 80 truncated by amplifier 46 and the portion of pulse 81 truncated by amplifier 44 are shown in FIG. 5 by the cross-hatched lines.

An examination of FIG. 5 and in particular pulses 80 and 81 shows that in the absence of truncation provided by amplifiers 44 and 46 SCR1 and SCR2 would conduct simultaneously. Thus, amplifiers 44 and 46 function in a manner so as to truncate the respective SCR firing pulses when the sychronizing voltage goes through zero and also function in a manner to prevent simultaneous conduction of the SCRs.

Figure 6:
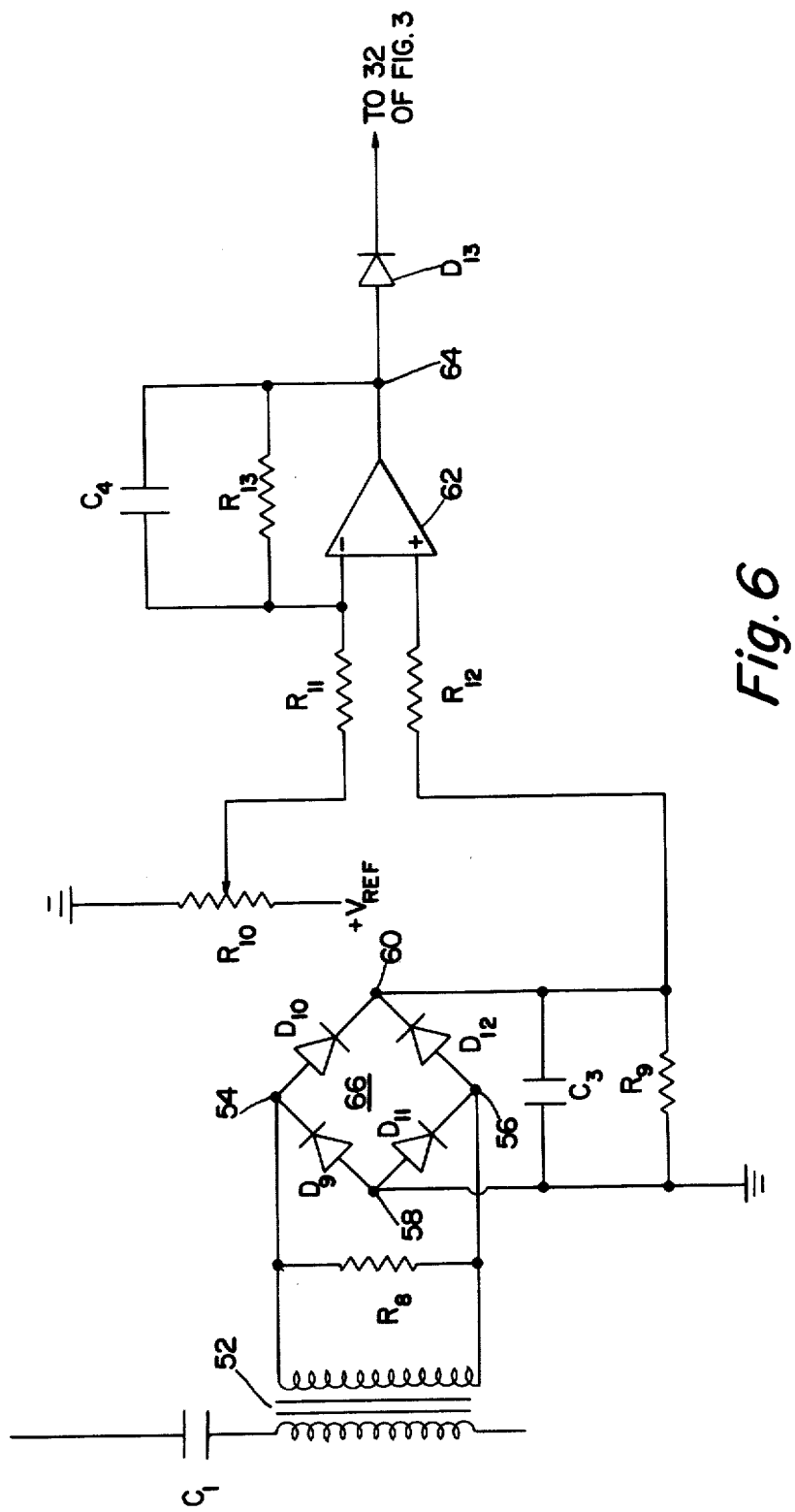
FIG. 6 shows a detailed schematic diagram of the circuit of the present invention.

Referring to FIG. 6 there is shown a detailed schematic diagram of a circuit according to the present invention for detecting excess regulated supply output ripple and regulating the supply output voltage in accordance therewith.

Ripple current is always present in the output of a three phase regulated supply. With the input voltages balanced, the ripple frequency will be 360 hertz and the ripple current will have an amplitude which is well below the ripple rating of output filter capacitor $C_1$. Should however the input phases become either unbalanced or one of the phases be lost, the output ripple current will increase in amplitude and may even exceed the rating of filter capacitor $C_1$. Under those circumstances the capacitor may be damaged to the point of failure or the associated protecting fuses, if any, will be blown. The circuit of FIG. 6 functions in a manner so as to regulate the regulated supply output voltage whenever the ripple current exceeds a predetermined amplitude.

A transformer 52 having its primary winding in series with filter capacitor $C_1$ is utilized to sense the ripple current. Connected in parallel across the secondary winding of transformer 52 is a resistor $R_8$ which provides a fixed load for the transformer. The sensed ripple current in the form of a voltage appears across the input terminals 54 and 56 of a full wave bridge rectifier 66. The bridge comprises diodes $D_9$, $D_{10}$, $D_{11}$ and $D_{12}$ with the cathode of diode $D_9$ being connected to the anode of diode $D_{10}$ at input terminal 54 and the cathode of diode $D_{11}$ being connected to the anode of diode $D_{12}$ at input terminal 56. The anodes of diodes $D_9$ and $D_{11}$ are connected together at output terminal 58 and the cathodes of diodes $D_{10}$ and $D_{12}$ are connected together at the other output terminal 60. A d-c signal whose magnitude is a function of the ripple current in capacitor $C_1$ appears across output terminals 58 and 60 of bridge 66. Connected in parallel relationship across the output terminals of bridge 66 are capacitor $C_3$ and resistor $R_9$. Capacitor $C_3$ provides filtering to the full wave rectified ripple and resistor $R_9$ functions as a load on the capacitor. Should the input to the bridge decrease in amplitude, resistor $R_9$ will therefore allow the voltage across capacitor $C_3$ to also decrease.

The filtered d-c output voltage from bridge 66 is applied to the noninverting input of operational amplifier 62 through resistor $R_{12}$. The inverting input of amplifier 62 is connected through fixed resistor $R_{11}$ and adjustable resistor $R_{10}$ to a source of reference voltage. Adjustable resistor $R_{10}$ sets the level at which the ripple current will be regulated. The setting of resistor $R_{10}$ is dependent on the ripple rating of capacitor $C_1$. The ripple rating is a measure of the amount of ripple current the capacitor may safely handle. While capacitor $C_1$ has been shown in FIGS. 3 and 5 as a single capacitor it should be appreciated that the capacitor may also comprise a bank of capacitors. The reference voltage is generated from a source which may for example be a zener diode. The source may be the same source which is used to generate the reference voltage of FIG. 3.

Connected between the output 64 of amplifier 62 and the inverting input thereof is a parallel network comprising capacitor $C_4$ and resistor $R_{13}$. Resistor $R_{13}$ sets the gain of amplifier 62 and in combination with capacitor $C_4$ introduces phase shift to provide stability in the loop. The amount of phase shift introduced will depend upon the component values chosen for $R_{13}$ and $C_4$. Amplifier 62 functions to compare the dc signal representing the amplitude of ripple current flowing through filter capacitor $C_1$ with the reference signal which represents the maximum allowable ripple amplitude. When the amplitude of the ripple flowing through capacitor $C_1$ exceeds the reference the output 64 of amplifier 62 becomes positive. The amplifier output is connected through a diode $D_{13}$ to junction 32 of FIG. 3.

Referring back to FIG. 3 it is also seen that the output of operational amplifiers 28 and 30 are connected through diodes $D_7$ and $D_8$, respectively, to junction 32. The diodes $D_7$, $D_8$ and $D_{13}$ are arranged in an "OR" configuration. Thus as described previously for FIG. 3 only one of the amplifiers 28, 30 or 62 with the most positive output voltage will forward bias its associated diode and reverse bias the diodes associated with the other amplifiers.

Should the ripple current exceed the reference either because of a lost input phase or an unbalance in the input phases the output of amplifier 62 will become more positive than the outputs of amplifiers 28 and 30 thereby forward biasing diode $D_{13}$ and reverse biasing diodes $D_7$ and $D_8$. The error signal appearing at junction 32 will then be representative of the excessive ripple and the firing of the thyristors will then be controlled in accordance with this excessive ripple to thereby decrease the regulated supply output voltage until the ripple becomes less than or equal to the predetermined reference value.

If the ripple current should continue to exceed the reference because of an increasig unbalance in the phases or a lose of another phase the firing times of the thyristors will be further adjusted to decrease the regulated supply output and therefore the ripple. Increasing amplitude of ripple above the reference results in an increasing amplitude of error signal appearing at junction 32. As shown in FIG. 5 increasing amplitude of error signal results in the firing times of the thyristors occurring later in each respective half cycle of the synchronizing voltage. Delaying of the firing times of the thyristors decreases the regulated supply output voltage.

Should the ripple continue to increase in amplitude the firing times of the thyristors will be further delayed until a condition is reached where no firing of the thyristors occurs in each half cycle and the regulated supply output voltage then goes to the voltage determined by the diodes $D_1$ to $D_6$ for the supply of FIG. 2. Without those diodes the output voltage of the supply would, of course, go to zero. Thus the circuit of FIG. 6 allows the supply output voltage to be regulated in accordance with the output ripple when that ripple exceeds a predetermined magnitude.

Representative values and ratings where applicable of the components of the ripple regulating circuit of FIG. 6 for a three phase thyristor controlled regulated supply having a nominal dc output voltage of 48 volts and an output current of 100 amperes are listed below:

$R8 = 51$ ohms $R9 = R11 = R12 = 10 \times 10^3$ ohms $R10 = 5 \times 10^3$ ohms (adjustable)

$R13 = 4.7 \times 10^6$ ohms $C1 = 22,000$ microfarad, 75 VDC $C3 = 100$ microfarad, 25 VDC $C4 = 0.33$ microfarad, 100 VDC For the above supply, diodes D9, D10, D11, D12 and D13 of FIG. 6 may be 1N 4818 diodes and the reference voltage (VREF) may be set at +12 volts.

While regulation of the output voltage of a three phase regulated supply in accordance with excessive output ripple has been shown in connection with a rectifier circuit utilizing thyristors as the switchable element, it should be appreciated that the circuit of the invention may be used with any multiphase regulated supply having an output filter capacitor. It should further be appreciated that while sensing of the ripple has been shown in connection with a transformer having its primary winding in series with the filter capacitor other means may be used to sense the ripple. Unbalance of the input phases or a loss of an input phase causes changes in the ripple frequency which may be sensed in a variety of ways.

It is understood that the description of this preferred embodiment is intended to be only illustrative, rather than exhaustive, of the present invention. Those of ordinary skill will be able to make certain additions, deletions, and/or modifications to embodiments of the disclosed subject matter without departing from the spirit of the invention or its scope, as defined by the appended claims.

What is claimed is:

1. A ripple regulation circuit adapted for use in a multiphase regulated supply which generates a filtered d.c. output signal having ripple, said supply including:
   (i) adjustable regulating means for regulating the value of said output signal;
   (ii) means for generating a first error signal having a magnitude dependent on the amount by which an actual value of said d.c. output signal deviates in a predetermined direction from a reference value; and
   (iii) control means connected to said regulating means and responsive to an error control signal equal to said first error signal for adjusting said regulating means to maintain said actual value equal to said desired value;

said circuit comprising:
   (a) means responsive to said ripple for generating a second error signal having an amplitude dependent on the amount by which the actual d.c. value of said ripple deviates in a predetermined direction from a desired d.c. value of said ripple; and
   (b) means responsive to said first and second error signals for selecting said error control signal as being equal only to the larger amplitude one of said first and second error signals, said control means adjusting said regulating means when said error control signal is equal only to said second error signal to thereby maintain said ripple d.c. value substantially equal to said desired value.

2. The ripple regulation circuit of claim 1 wherein said regulating means of said supply includes an output filter and wherein said circuit means responsive to said ripple includes means associated with said output filter for sensing said ripple and developing said actual d.c. value.

3. The circuit of claim 2 wherein said output filter includes a capacitor and said sensing means includes a transformer having its primary winding in series with said capacitor, said transformer generating a ripple representative signal across its secondary winding.

4. The circuit of claim 3 wherein said sensing means further includes rectifying means responsive to said ripple representative signal across said secondary for generating said actual d.c. value.

5. In a multiphase regulated supply of the type having at least one switching element associated with each of a respective one of said phases each of said switching elements having a controllable conduction time, said supply generating a filtered d.c. output signal having a ripple, said supply including control means responsive to an error control signal equal to a first error signal having an amplitude dependent on the amount by which an actual value of said d.c. output signal deviates in a predetermined direction from a reference value for controlling said conduction time to thereby maintain said output signal d.c. value substantially equal to said desired value the improvement therein comprising:
   (a) means responsive to said ripple present in said filtered d.c. output signal for generatig a second error signal having an amplitude dependent on the amount by which the actual d.c. value of said ripple deviates in a predetermined direction from a desired d.c. value of said ripple; and
   (b) means responsive to said first and second error signals for selecting said error control signal as being equal only to the larger amplitude one of said first and second error signals said control means controlling said conduction times when said error control signal is equal only to said second error signal to thereby maintain said ripple d.c. value substantially equal to said desired value.

6. The circuit of claim 5 wherein said regulated supply further includes an output filter for generating said filtered d.c. output signal and wherein said circuit means responsive to said ripple includes means associated with said output for sensing said ripple and developing said actual d.c. value.

7. The circuit of claim 6 wherein said output filter includes a capacitor and said sensing means includes a transformer having its primary winding in series with said capacitor said transformer generating a ripple representative signal across its secondary winding.

8. The circuit of claim 7 wherein said sensing means further includes rectifying means responsive to said ripple representative signal across said secondary for generating said actual d.c. value.

9. A multiphase power supply for generating a regulated and filtered unidirectional electrical output signal comprising:
   (a) regulating means responsive to a multiphase a.c. input signal and having at least one controllable switching element associated with each phase, each of said switching elements having a controllable conduction time for generating said regulated and filtered unidirectional electrical output signal;
   (b) first error signal generating means responsive to said electrical output signal for generating a first error signal having an amplitude dependent on the amount by which an actual d.c. value of said electrical output signal deviates from a desired d.c. value of said signal;
   (c) second error signal generating means responsive to a signal representative of the d.c. value of the ripple present in said electrical output signal for generating a second error signal having an amplitude dependent on the amount by which the actual d.c. value of said ripple deviates from a desired d.c. value of said ripple;
   (d) means responsive to said first and second error signals for generating an error control signal, said error control signal being equal only to the larger amplitude one of said first and second error signals; and
   (e) control means responsive to said error control signal and connected to said regulating means for adjusting said switching elements' controllable conduction time whereby said control means controls said regulating means so as to tend to maintain the d.c. value of said output at said desired value when said error control signal is only said first error signal and to tend to maintain the d.c. value of said ripple at said desired value when said error control signal is only said second error signal.

10. The supply of claim 9 wherein the number of said controllable switching elements associated with each phase is two and said means for controlling the state of said switching elements includes means for generating pulses to said switching elements said elements switching from the non-conductive to conductive state in response thereto.

11. The supply of claim 10 wherein said pulses are generated to each switching element once during each cycle of the associated a.c. input signal.

12. The supply of claim 11 wherein each of said switching elements are thyristors.

13. The supply of claim 8 wherein the number of switching elements per phase is one and wherein said means for controlling the state of said switching elements includes means for generating pulses to said switching elements said elements switching from the non-conductive to conductive state in response thereto.

14. The supply of claim 9 wherein said regulating means further includes output filtering means for generating said regulated and filtered electrical output signal.

15. The supply of claim 14 wherein said filter means includes a capacitor across which said electrical output signal is generated and said supply signal further including means associated with said capacitor for sensing said ripple and generating said signal representative of said d.c. value thereof.

16. The supply of claim 15 wherein said sensing means includes a transformer having its primary winding in series with said capacitor said transformer generating a ripple representative signal across its secondary winding.

17. The supply of claim 16 wherein said means for generating said second error signal includes means responsive to said ripple representative signal for rectifying said signal and generating said actual d.c. signal in response thereto.

18. A system for controlling a regulated and filtered unidirectional electrical output, comprising:

(a) multiphase regulating means adjustable to regulate the value of the output;

(b) control means connected to the regulating means for adjusting the regulating means in dependence on an error control signal;

(c) first signal-producing means connected to be responsive to the said electrical output for producing a first error signal having an amplitude dependent on the difference between actual and desired values of the d.c. value thereof;

(d) second signal-producing means connected to be responsive to the presence of ripple in the electrical output so as to produce a second error signal having an amplitude dependent on the difference between actual and desired values of the d.c. value thereof;

(e) means responsive to said first and second error signals for producing said error control signal, said error control signal being only said first error signal when said first error signal amplitude is greater than said second error signal amplitude, said error control signal being only said second error signal when said second error signal amplitude is greater than said first error signal amplitude; and (f) means feeding the error signal to said control means whereby the control means controls the regulating means so as to tend to maintain the d.c. value of the output at the desired value when said error control signal is only said first error signal and to tend to maintain the d.c. value of said ripple at the desired value when said error control signal is only said second error signal.

19. The system of claim 18 wherein said regulating means includes at least one controllable switching element associated with each phase, each of said elements having conductive and nonconductive states.

20. The supply of claim 19 wherein the number of said controllable switching elements associated with each phase is two and said control means further includes means responsive to said error signal for generating pulses to said switching elements, said switching elements switching from the nonconductive to conductive state in response thereto.

21. The supply of claim 20 wherein said pulses are generated to each switching element once during each cycle of the a.c. input signal associated with said phase.

* * * * *